March 1, 1966 A. S. JANKOWSKI 3,238,455

MAGAZINE FOR SUPPORTING A PLURALITY OF ELECTRICAL DEVICES AND APPARATUS FOR MAKING ELECTRICAL CONTACT TO DEVICES SUPPORTED THEREIN

Filed April 18, 1962 3 Sheets-Sheet 1

INVENTOR.
ALFRED S. JANKOWSKI
BY
David M. Keay
AGENT.

INVENTOR.
ALFRED S. JANKOWSKI
BY
David M. Keay
AGENT.

March 1, 1966 A. S. JANKOWSKI 3,238,455

MAGAZINE FOR SUPPORTING A PLURALITY OF ELECTRICAL DEVICES AND APPARATUS FOR MAKING ELECTRICAL CONTACT TO DEVICES SUPPORTED THEREIN

Filed April 18, 1962

3 Sheets-Sheet 3

INVENTOR.
ALFRED S. JANKOWSKI
BY
David M. Keay
AGENT.

3,238,455
Patented Mar. 1, 1966

3,238,455

MAGAZINE FOR SUPPORTING A PLURALITY OF ELECTRICAL DEVICES AND APPARATUS FOR MAKING ELECTRICAL CONTACT TO DEVICES SUPPORTED THEREIN

Alfred S. Jankowski, Stoneham, Mass., assignor to Sylvania Electric Products Inc., a corporation of Delaware

Filed Apr. 18, 1962, Ser. No. 188,478
5 Claims. (Cl. 324—158)

Figures 1, 2, 3:
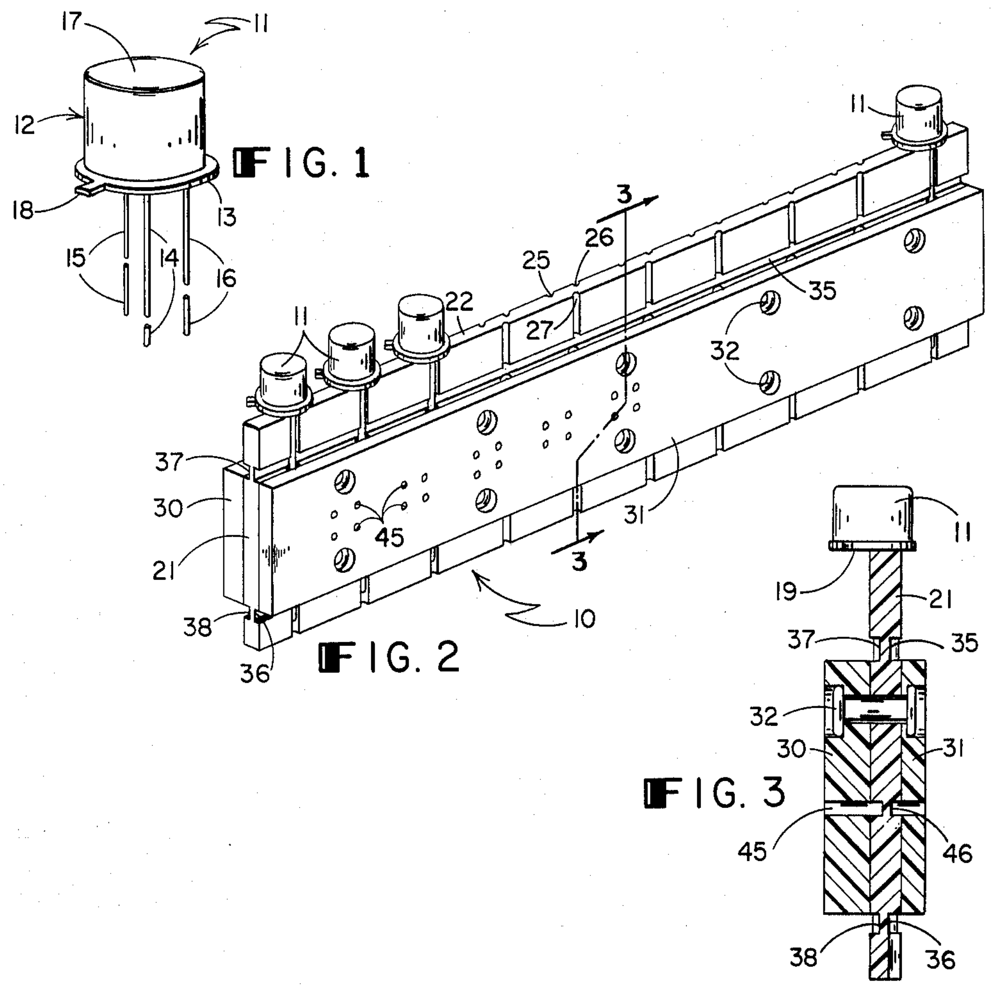

This invention relates to apparatus for supporting a plurality of electrical devices in a convenient array for presenting the devices at positions at which identical or a succession of different operations may be performed on the devices. More particularly, it is concerned with a magazine or rack for supporting a plurality of electrical devices which is adapted to be removably inserted in a fixture in order to provide contact to the leads of the devices so that electrical tests may be conducted thereon.

Small electrical devices, such as, for example, transistors are manufactured in large quantities by employing mass-production techniques. Although transistors are small in physical size they possess many electrical characteristics each of which must be within certain specified limits in order for a device to be considered satisfactory. Therefore, completed transistors are thoroughly tested in order to insure that only those devices which meet all the electrical requirements are shipped to customers.

The electrical testing of every transistor manufactured provides a method of separating the unsatisfactory devices from those which are satisfactory. However, additional testing is generally desirable in order to provide a volume of statistical data for constantly determining the efficiency and effectiveness of control of the manufacturing processes.

Test data for thorough analysis is generally obtained from a random sample of devices taken from each production lot. The selected transistors may be subjected to various testing procedures, but regardless of the particular testing program, each transistor is subjected to repeated electrical testing over an extended period of time. Each time that data is taken on a transistor, that transistor must be uniquely identified and the test data recorded. All the accumulated data on each transistor must be collected in order that the information can be processed and properly evaluated.

Transistors are multi-lead devices usually having leads which are fairly long relative to the size of the body of the device. The leads are subject to bending, twisting, and intertwining from constant handling during fabrication of the transistor and subsequent testing. Therefore, it is often a problem to apply electrical contacts to the leads of transistors for the purpose of conducting electrical tests.

Usually when conducting an electrical test, an operator inspects each transistor visually, determines the internal connections of each lead, and manipulates the leads while inserting the device in a test fixture which makes contact to the leads. This procedure of placing a device in a test fixture is time consuming. If automatic or semiautomatic equipment which tests several electrical characteristics of a device and then records the test results is being employed, the equipment is being used very inefficiently. The operator must also identify the particular individual transistor, as by reading a number taped to the device, and cause this designation to be recorded together with the test data. The foregoing procedure must be repeated for each transistor tested and each time a set of test data is taken on a transistor.

It is an object of the present invention, therefore, to provide apparatus for handling and testing a plurality of electrical devices as a unit or batch.

It is another object of the invention to provide a magazine for supporting a plurality of electrical devices in predetermined spaced apart relationship.

It is also an object of the invention to provide a magazine for supporting a plurality of electrical devices and a fixture for receiving the magazine so as to enable the electrical devices in the magazine to be identified and electrical contact to be made to their leads.

Briefly, in accordance with the foregoing objects of the invention a magazine for supporting a plurality of electrical devices is provided which includes a support member having a plurality of equally spaced device positions along its length. Means which are adapted to receive the leads of a device are arranged at each of these device positions. Lead contact access means for exposing the leads of a device to permit contact to be made thereto are also provided at each position. The fixture or support which is adapted to receive the magazine includes lead contacts which contact the leads of the electrical devices in the magazine at the lead contact access means of the magazine when the magazine is in position in the fixture.

Figure 4:
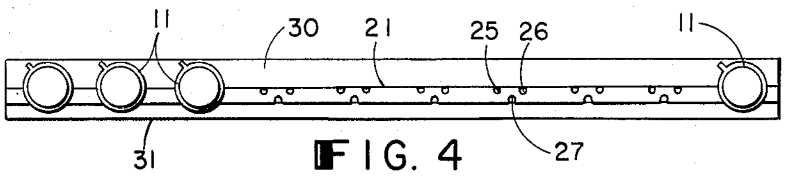
Figure 6:
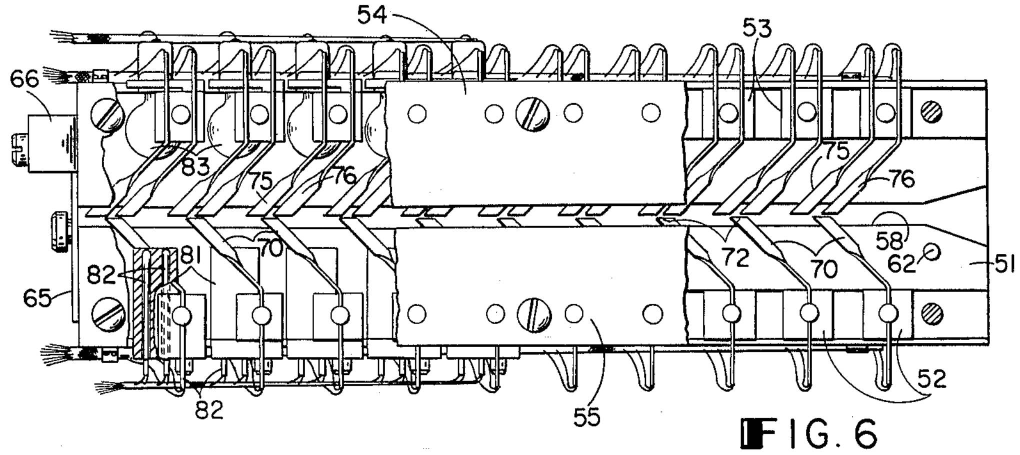
Figures 5, 7:
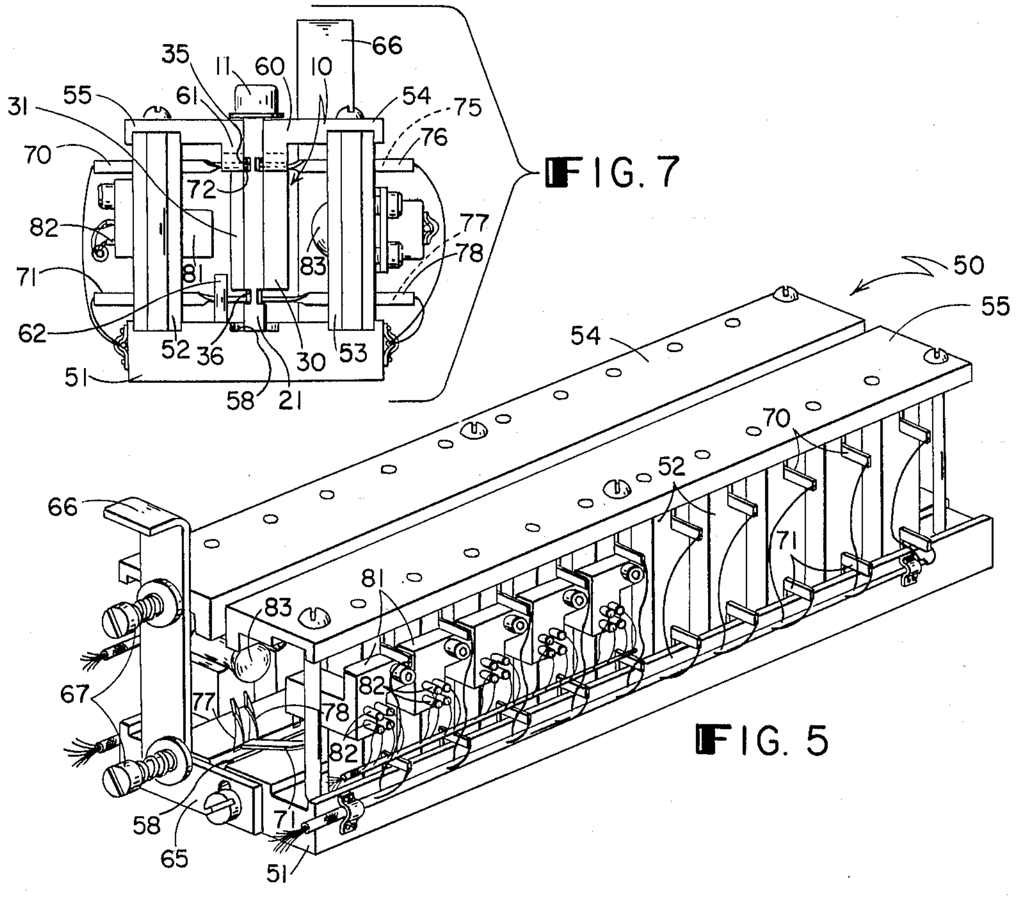
Figure 8:
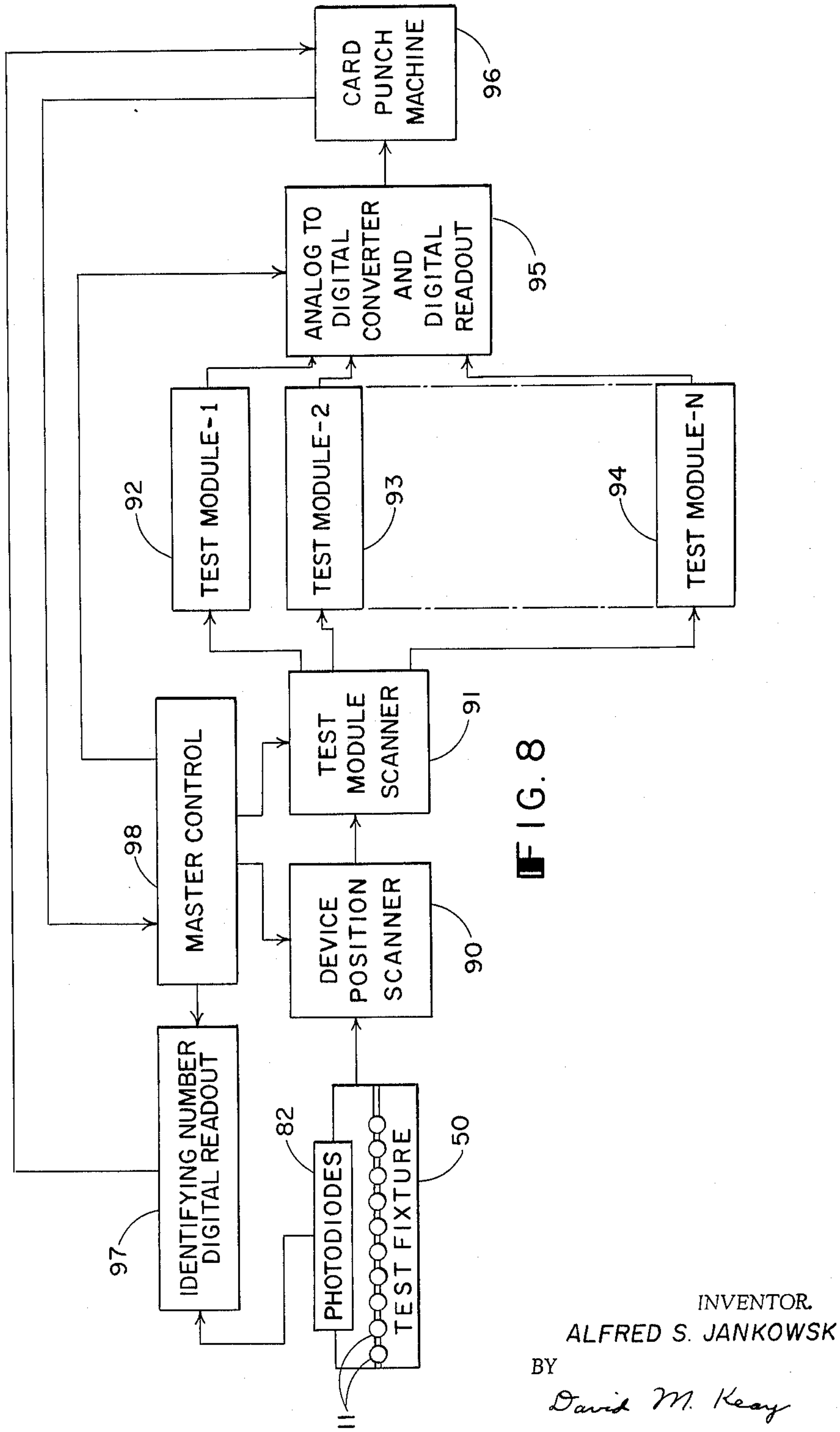

Additional objects, features, and advantages of apparatus according to the present invention will be apparent from the following detailed discussion and the accompanying drawings wherein:

FIG. 1 is a perspective view of a typical transistor of a standard configuration, FIG. 2 is a perspective view of a magazine for supporting transistors of the type of FIG. 1 in accordance with the invention, FIG. 3 is a cross-sectional view of the magazine of FIG. 2 taken generally along the line 3—3 of FIG. 2, FIG. 4 is a plan view of the magazine of FIG. 2, FIG. 5 is a perspective view of a fixture which is adapted to receive the magazine of FIG. 2 and make electrical contact to the leads of transistors mounted therein, FIG. 6 is a plan view of the fixture of FIG. 5 with portions broken away to illustrate various features, FIG. 7 is a rear view of the fixture of FIG. 5 showing a magazine in test position in the fixture, and FIG. 8 is a block diagram illustrating schematically the manner of employing the magazine and fixture of the invention in conjunction with automatic testing equipment.

The magazine 10 illustrated in FIGS. 2, 3, and 4 supports ten transistors 11, which are of a standard size and shape and have three external leads. In order better to illustrate the magazine and its various features only a few transistors are shown positioned in the magazine. Each transistor as shown in FIG. 1 has a generally cylindrical body or case 12 which encloses the electrically active elements of the device. The body includes a stem portion 13 having a generally planar surface (not visible in FIG. 1) from which the three leads 14, 15, and 16 of the device emerge. The active elements of the device are usually mounted on the stem and a cylindrical cover 17 is welded to the stem to provide the sealed enclosure. The leads extend parallel to each other and are spaced in a circular array at the surface of the body from which they emerge. Two of the leads 14 and 15, which are the emitter and collector leads respectively, are located diametrically opposite each other, and the third lead 16, which is the base lead, is located equally distant from the other two leads. A projection or tab 18 on the periphery of the body at a position approximately 45° from the emitter lead toward the collector lead provides a reference point on the body which may be used to identify each lead.

The magazine 10 includes a support member 21 which is a flat rectangular plate of a suitable insulating material such as a mineral-filled phenolic type plastic. The thickness of the plate is slightly greater than the radius of the circular array of leads of the transistor. A series of ten equally spaced device positions are arranged along the length of the support member. Extending perpendicular to the upper edge surface 22 of the plate 21 at each device position are a set of lead receiving grooves. On the right side of the plate as viewed from the right hand end of the plate as shown in FIGURES 2 and 4, at each device position are two grooves 25 and 26 which are spaced apart a distance equal to the distance between the emitter and collector leads of a transistor. A third groove 27 at each device position is on the left side of the plate equally distant from the other two grooves. The width and depth of each of the grooves are slightly greater than the diameter of a transistor lead.

A first flat rectangular lead retaining plate 30 of an insulating material is securely mounted against the right side of the support member 21. A second flat rectangular lead retaining plate 31 which is approximately one-half the thickness of the first plate is mounted against the left side of the support member. Passages are thus formed along the portions of the lead receiving grooves overlaid by the lead retaining plates. The lead retaining plates are securely attached to the support member as by a plurality of pairs of eyelets 32 equally spaced along the length of the magazine.

On each side of the support member are two grooves or slots 35 and 36, and 37 and 38 which form channels extending along the length of the magazine parallel to the upper edge surface 22 of the support plate. There is a channel adjacent the upper and lower edge surface of each of the lead retaining plates. The channels are equal in depth to the depth of the lead receiving grooves 25, 26, and 27.

As shown in the figures, the leads of a transistor 11 are placed in the lead receiving grooves at a device position with the emitter and collector leads 14 and 15 in the two grooves 25 and 26 on the right side of the support member, and with the base lead 16 in the single groove 27 on the left side. The transistor leads are inserted into the lead receiving passages and the transistor positioned with the planar surface 19 of the body from which the leads extend adjacent the upper edge surface 22 of the support member, as best shown in FIG. 3.

When the body of the transistor is in contact with the upper edge surface, the leads extend through the lead receiving passages beyond the lower edge surface of the lead retaining plates 30 and 31. Two portions of each lead are exposed since they lie in the channels 35 and 36 or 37 and 38. No other portions of the leads protrude beyond any of the outermost surfaces of the magazine in their immediate vicinity. The thicknesses of the lead retaining plates 30 and 31 are chosen such that they extend outward on each side beyond the body of the transistor, and thus the transistor is protected when magazines are placed on their sides and stacked.

The magazine has a plurality of passages 45 arranged in groups of four which are spaced at equal intervals along the forward portion of the magazine. As can best be seen in FIG. 3, the passages extend completely through each of the lead retaining plates, but thin septums 46 or walls in the support member prevent the passages from extending completely through the magazine. The passages and the septums thereacross provide a means of encoding a numerical identifying designation of the magazine by the selective rupturing of septums.

With the arrangement of passages 45 as illustrated, each group of four passages may be used to encode in binary form a designation for any digit from 0 through 9 depending on which of the septums are ruptured. Thus, with five groups of four number coding passages each as shown in the magazine of FIG. 2, the magazine may be encoded with any decimal number designation up to five digits. The device position which each of the ten transistors in a magazine occupies serves to identify each individual transistor in the magazine. If desired, alternative numerical identifying systems could be used. For example, the twenty number coding passages in the magazine could be employed in a straight-forward binary system.

A test fixture 50 or receptacle adapted to receive the magazine 10 and make electrical contact to the leads of transistors supported in the magazine is illustrated in FIGS. 5, 6, and 7. FIGS. 5 and 6 illustrate the fixture without a magazine, and FIG. 7 shows the fixture having a magazine located in test position. The fixture includes a base member 51, ten vertical support members 52 along the left side of the fixture as viewed from the right hand end of the fixture as shown in FIGURES 5 and 6, ten vertical support members 53 along the right side of the fixture, and two upper plates 54 and 55 (broken away in FIG. 6). The base member and upper plates are of a suitable electrical insulating material such as molded or laminated plastic. The vertical support members may be, for example, nylon.

The base member 51 has a groove or channel 58 along its length which is adapted to receive the bottom section of the magazine support member 21. The upper section of the magazine support member fits between the surfaces of the inner sections 60 and 61 of the upper plates 54 and 55. The magazine is positioned vertically in the fixture by the lower edge surfaces of the inner sections of the plates which bear against the upper edge surfaces of the magazine lead retaining plates 30 and 31. The channel in the base member and the inner sections of the upper plates thus provide a track adapted to support a magazine while it is moved in a direction along the length of the fixture.

An orienting pin 62 for insuring that a magazine is placed in the fixture forward end first is mounted on the left side of the base member adjacent its rearward end. The pin is spaced from the adjacent edge of the channel 58 a distance greater than the thickness of the left lead retaining plate 31 of the magazine but less than the thickness of the right lead retaining plate 30. Thus, the pin prevents the magazine from being inserted in the fixture rearward end first while permitting it to be inserted forward end first.

Located at the forward end of the fixture is a magazine stop 65. The stop normally lies across the channel 58 in the base member so as to prevent a magazine from being moved beyond the stop. The channel may be unblocked by depressing the stop handle 66 and thus lowering the stop below the floor of the channel. Bolt, spring, and washer arrangements 67 bias the stop against the fixture so that it remains in either the raised or lowered position.

Mounted in each of the ten vertical support members 52 at the left side of the fixture are two spring contact members 70 and 71, one above the other. Each upper contact member 70 has a horizontally disposed contact edge 72 arranged at a height above the floor of the channel 58 in the base member equal to the distance from the lower edge of the magazine support member to the upper channel 35 in the magazine. In order to accommodate the contact members, which lie above the lower surface of the inner section 61 of the upper plate 55, there are a plurality of recesses in the surface of the inner section. The ten upper spring contact members are arranged along the left side of the test fixture so that the horizontal distance from the magazine stop 65 to a contact edge is equal to the distance from the forward edge of the magazine to a lead receiving groove 27 in the magazine. Each lower contact member 71 is similar to the upper contact members and its contact is directly below the contact of an upper contact member mounted in the same vertical support member. The lower contact members are arranged at a height above the floor of the channel 58 in the base member equal to the distance from the lower edge of the magazine support member to the lower channel 36 in the magazine.

Four spring contact members 75, 76, 77, and 78 are mounted in each of the ten vertical support members 53 at the right side of the fixture. One pair 75 and 76 are arranged with their contact edges at the same height above the floor of the channel 58 in the base member as the height of the upper contact members 70 at the left side of the fixture. A plurality of recesses in the lower surface of the inner section 60 of the upper plate 54 accommodates the contact members, which lie above the level of the lower surface. The twenty upper contact members are arranged along the length of the right side of the test fixture so that the horizontal distance from the magazine stop 65 to a contact edge is equal to the distance from the forward edge of the magazine to a lead receiving groove 25 or 26 in the right side of the magazine. Each of the two lower contact members 77 and 78 of a pair is located with its contact edge directly below that of an upper contact member and at the same height above the floor of the channel 58 in the base member as the height of the lower contact members 71 at the left side of the fixture. The contact members are of a suitable spring material for making electrical contact, such as beryllium copper.

The test fixture thus provides ten test stations spaced along its length. Each test station includes the six contact members supported in two vertical support members which are located opposite each other. The contact members at a station are adapted to make electrical contact to the leads of a transistor supported in one of the device positions of a magazine when the magazine is inserted into testing position in the fixture with its forward edge abutting the magazine stop. The three upper contact members at a station each contact a different transistor lead at the portions of the leads exposed at the upper lead access channels. The lower contact members at a station each contact a different one of the three leads at the portions of the leads exposed at the lower lead access channels. Two separate contacts are made to each transistor lead so that an operating bias may be applied through one contact and output readings to be measured may be taken from the device at the other contact, thereby reducing the effect contact resistance has on the readings taken. Since with the transistor bodies in contact with the upper edge surface of the support member the contact members always contact leads at the same distance from the bodies, the possibility of variations in readings because of variations in lead length is avoided.

Located on the left side of the fixture are five photodiode mountings 81 each supporting four photodiodes 82. The four photodiodes in each group are arranged in the same pattern as the four passages 45 in each group of number coding passages in the magazine. The photodiodes are located at a height above the floor of the channel 58 in the base member equal to the distance from the lower edge of the support member 21 of the magazine to the number coding passages 45 in the magazine. The five groups of photodiodes are arranged along the length of the fixture at a distance from the stop 65 equal to the distance from the forward edge of the magazine to each of the groups of number coding passages in the magazine. Mounted along the right side of the fixture are a plurality of lamps 83 for providing a source of light to impinge on exposed photodiodes.

One form of apparatus for automatically testing and recording test data on transistors which may utilize the magazine and test fixture described hereinabove is illustrated in block diagram form in FIG. 8. Wiring from the lead contact members of the fixture 50 is connected to a device position scanner 90. The scanner operates to connect the wiring from each device in sequence to the test module scanner 91. The test module scanner connects each of the test modules 92, 93, 94 in sequence to the test device selected by the scanner. The output from each test module indicating a test result is converted into a digital signal by an analog to digital converter and digital readout 95 which in turn transmits the information to a card punch machine 96 for recording on a card. The photodiodes 82 in the fixture are connected to an identifying number readout 97 which provides a digital signal to the card punch machine. A master control 98 coordinates the automatic operation of the various sections of the system so that when a magazine is inserted into the fixture, each transistor is tested and the test data on each transistor together with the identifying number of the magazine and the position number in the magazine is recorded on a separate card.

In carrying out a test procedure on a group of ten transistors supported in a magazine, the magazine 10 is inserted into the fixture 50 from the rear. The lower section of the support member 21 of the magazine fits in the channel 58 in the base member 51, and the upper section fits between the two upper plates 54 and 55. The orienting pin 62 insures that the magazine is inserted forward end first. As the magazine is advanced into the fixture, the contact edges of the lead contact members engage the lead access channels 35, 36, 37, and 38 in the magazine. The upper and lower edge surfaces of the two lead retaining plates 30 and 31 assist in guiding the contact members into the channels. The direction of the spring biasing action of the contact members readily permits the magazine to slide forward and the contact members to ride over the portions of the transistor leads which protrude into the channels.

The magazine is advanced until its forward end abuts the magazine stop 65. With the magazine and fixture in this relative position, each transistor in the magazine is at a test station of the fixture with the lead contact members each contacting an exposed portion of a transistor lead. The number coding passages 45 in the magazine are each adjacent a different photodiode.

A testing cycle is started either automatically or by the operator when the magazine is fully inserted at its test position in the fixture. Light from the lamps 83 activates those photodiodes 82 which are adjacent a magazine number coding passage 45 having a ruptured septum. The identifying number digital readout 97 is actuated by the master control 98 and provides a digital signal in response to the output signals produced by the photodiodes. The digital signal causes the identifying number encoded in the passages 45 of the magazine to be recorded on a card by the card punch machine 96. The digits 01 are also recorded in order to indicate that the test data to be recorded on the card applies to the forwardmost, or first, transistor supported in the magazine.

The device position scanner 90 connects the six lead contact members contacting the leads of the first transistor to the test module scanner 91. The test module scanner connects the contact members to the first test module 92. The first test module conducts a test on the first transistor and the results of the test are conducted to the analog to digital converter and digital readout 95. Under the control of the master control 98 the analog to digital converter and digital readout provides a digital signal to the card punch machine 96 which records the result of the first test on the card.

The test module scanner 91 is then actuated by the master control 98 to switch the transistor connections to the second test module 93. After that test is conducted and the data recorded on the card, the remaining test modules are connected to the transistor in sequence and all the data is recorded on the card. Upon completion of the final test, as by test module-N, and recording of the data, the card drops from the card punch machine 96 to be replaced by a new card and the master control 98 causes the device position scanner 90 to connect the lead contact members in contact with the second transistor to the test module scanner.

When the second transistor is connected into the system, the master control 98 causes the magazine identifying number to be read by the photodiodes and identifying number digital readout and then recorded on the new card by the card punch machine. An 02 is also recorded indicating that the second transistor in the magazine is to be tested. The master control then causes the test module scanner 91 to connect the transistor to each test module in sequence and the data to be recorded on the card. When the testing of the transistor and recording of the data is completed, the third transistor is caused to be tested and its magazine and position identifying numbers together with the tests results are recorded on a card. The procedure is continued until all the information on each of the transistors in the magazine has been recorded on cards.

When an indication such as a suitable visual signal from the master control 98 is received indicating that the automatic test procedure for all transistors in the magazine has been completed, the magazine stop 65 is lowered and the magazine removed from the fixture by withdrawal at the forward end of the fixture. Another magazine may then be inserted into the test fixture and the automatic testing and recording procedure repeated.

Although the manner in which the magazine and test fixture disclosed may be employed in conjunction with a particular automatic testing and recording system has been described, their usefulness is not limited to this one arrangement. For example, in the system disclosed two test fixtures might be employed together with an automatic switching arrangement for connecting the device position scanner and identifying number readout from one fixture to another in alternation. With this arrangement the operator may unload and reload one fixture while a test procedure is being conducted on the transistors in the other fixture. Utilization of the testing and recording system may thereby be increased.

In the magazine disclosed, the first transistor is located at a distance from the forward edge of the magazine equal to one-half the distance between transistors. The last transistor is similarly spaced from the reaward edge of the magazine. Therefore, several magazines may be placed in a line lengthwise along a track with all the transistors equally spaced apart. A suitable track could be employed in conjunction with certain automatic arrangements at the test fixture so that after a test procedure is completed on the transistors in a magazine, that magazine is automatically removed from the fixture as the next one is moved along the track into test position in the future.

The fixture for receiving the magazine may be modified depending upon the purpose for which the device leads are to be contacted. A fixture employing only the upper lead contact members, for example, and not having the lamps or photodiodes may be employed when it is desired simply to apply operating biases to the devices. With a fixture of this type, only the rapid connect and disconnect features of the fixture would be utilized.

It should also be noted that the five pairs of eyelets which hold the magazine together are equally spaced along the length of the magazine. If it is desired to move the magazine along a track in incremental steps which are equal to or multiples of the distance between adjacent transistors, the eyelets provide ten available referencing elements. The magazine could be moved by suitable driving means engaging the eyelets, or the eyelets could serve simply as positioning stops.

The manner in which the leads of each transistor straddle the support member of the magazine permits the magazine to be used as a support for transistors during their fabrication. The stem portion of the body on which the active elements of a transistor are mounted includes the three leads and the surface portion of the body through which they emerge. Transistor stems may be positioned in the magazine and remain in the magazine while the active elements are mounted and connected and the cover sealed to the stem to complete the enclosure. If desired during the fabrication steps, the devices may be partially withdrawn so that the surface of the body is removed from adjacent the upper edge surface of the magazine while at least the end portions of the leads remain inserted in the lead receiving passages.

The magazine according to the invention provides for the handling of a plurality of electrical devices as a unit. The leads of the devices are relieved of the possibilities of strain or damage and are maintained in predetermined positions relative to each other and the magazine. The test fixture as disclosed provides means for making contact to all the device leads accurately and efficiently. Each device remains uniquely identifiable as long as it is supported in a magazine by virtue of the identifying number encoded in the passages at the forward section of the magazine and the position in the magazine occupied by the device.

What is claimed is:

1. A magazine for removably supporting a plurality of electrical devices each having a plurality of leads emerging from a surface of the device in spaced apart relationship and extending generally parallel to each other comprising a substantially flat planar support plate of insulating material having an edge surface, a plurality of equally spaced device positions arranged in a straight line along the edge surface of the support plate, lead retaining plates of insulating material on the opposite major surfaces of said support plate, lead receiving passages intermediate said support plate and said lead retaining plates at each of said device positions extending generally perpendicular to the edge surface and parallel to each other for removably receiving the leads of the device with the leads straddling the support plate and the surface of the device adjacent the edge surface of the support plate, an edge surface of each of the lead retaining plates lying substantially parallel to the edge surface of the support plate to expose a portion of each of the opposite major surfaces of the support plate, and a lead access channel in each opposite major surface of the support plate extending along the support plate adjacent the edge surface of the lead retaining plate for exposing a portion of each lead of each device supported in the magazine to enable electrical contact to be made thereto.

2. A magazine for removably supporting a plurality of electrical devices each having a plurality of leads emerging from a surface of the device in spaced apart relationship and extending generally parallel to each other comprising a rectangular substantially flat planar support plate of insulating material having an edge surface, a plurality of equally spaced device positions arranged in a straight line along the edge surface of the support plate, substantially rectangular lead retaining plates of insulating material on the opposite major surfaces of said support plate, lead receiving passages intermediate said support plate and said lead retaining plates at each of said device positions extending generally perpendicular to the edge surface and parallel to each other for removably receiving the leads of a device with the leads straddling the support plate and the surface of the device adjacent the edge surface of the support plate, one edge surface of each of the lead retaining plates lying substantially parallel to the edge surface of the support plate and spaced from the edge surface of the support plate to expose a portion of each of the opposite major surfaces of the support plate, the opposite edge surface of each of the lead retaining plates lying substantially parallel to the edge surface of the support plate at a distance from the edge surface of the support plate less than the lengths of the leads of the devices and spaced from the edge of the support plate opposite said edge surface, and lead access channels in said support plate extending along the support plate parallel to said edge surface of the support plate, a different one of said channels lying adjacent each of said one edge surfaces and each of said opposite edge surfaces of the lead retaining plates.

3. Apparatus for holding a plurality of electrical devices and making electrical contact thereto, each device having a plurality of leads emerging from a surface of the device in spaced apart relationship and extending generally parallel to each other, said apparatus including in combination a magazine for removably supporting a plurality of electrical devices at equally spaced device positions arranged in a line along the magazine, a substantially flat planar support plate of insulating material in said magazine having an edge surface, lead retaining plates of insulating material on the opposite major surfaces of said support plate, lead receiving passages intermediate said support plate and said lead retaining plates at each of said device positions extending generally perpendicular to said edge surface and parallel to each other for removably receiving the leads of a device with the leads straddling the support plate and the surface of the device adjacent the edge surface of the support plate, an edge surface of each of the lead retaining plates lying substantially parallel to the edge surface of the support plate to expose a portion of each of the opposite major surfaces of the support plate, a lead access channel in each opposite major surface of the support plate extending along the support plate adjacent the edge surface of the lead retaining plate for exposing a portion of each lead of each device supported in the magazine to enable electrical contact to be made thereto, a plurality of identification encoding elements on the magazine for encoding a designation of the magazine in binary form, a magazine supporting fixture adapted to removably receive said magazine, a magazine stop on said fixture for positioning said magazine in testing position in the fixture, lead contact members arranged in a plurality of test stations along the magazine, the lead contact members at each test station engaging the lead access channels in the magazine and contacting the exposed portions of the leads of a device supported in a device position in a magazine when said magazine stop positions the magazine in testing position in the fixture, and signal producing means responsive to the indentification encoding elements on the magazine for providing signals indicative of the designation encoded in the identification encoding elements on the magazine for stop positions the magazine in testing position in the fixture.

4. A magazine for supporting a plurality of electrical devices according to claim 1 and including a plurality of identification encoding elements for encoding a designation of the magazine in binary form.

5. A magazine for removably supporting a plurality of electrical devices each having a plurality of leads emerging from a surface of the device in spaced apart relationship and extending generally parallel to each other comprising a rectangular substantially flat planar support plate of insulating material having an edge surface, a plurality of equally spaced device positions arranged in a straight line along the edge surface of the support plate, substantially rectangular lead retaining plates of insulating material on the opposite major surfaces of said support plate, lead receiving passages intermediate said support plate and said lead retaining plates at each of said device positions extending generally perpendicular to the edge surface and parallel to each other for removably receiving the leads of a device with the leads straddling the support plate and the surface of the device adjacent the edge surface of the support plate, one edge surface of each of the lead retaining plates lying substantially parallel to the edge surface of the support plate and spaced from the edge surface of the support plate to expose a portion of each of the opposite major surfaces of the support plate, the opposite edge surface of each of the lead retaining plates lying substantially parallel to the edge surface of the support plate at a distance from the edge surface of the support plate less than the lengths of the leads of the devices and spaced from the edge of the support plate opposite said edge surface, lead access channels in said support plate extending along the support plate parallel to said edge surface of the support plate, a different one of said channels lying adjacent each of said one edge surfaces and each of said opposite edge surfaces of the lead retaining plates, a plurality of identification encoding passages extending partially through said support plate and lead retaining plates, and septums across said passages which are selectively rupturable to provide passages extending completely through said support plate and lead retaining plates whereby the passages are adapted to serve as coding elements for encoding a designation of the magazine in binary form.

References Cited by the Examiner

UNITED STATES PATENTS

| | | | |
|---|---|---|---|
| 2,928,063 | 3/1960 | Gammel ----------- | 339—176 |
| 3,039,604 | 6/1962 | Bickel et al. -------- | 324—158 |

OTHER REFERENCES

Semiconductor Products, "Measurement of Switching Transistor Parameters," vol. 3, No. 2, February 1960, pages 43–46.

WALTER L. CARLSON, *Primary Examiner.*

E. L. STOLARUN, *Assistant Examiner.*